US012667098B2

(12) United States Patent
Fujiyama et al.

(10) Patent No.: US 12,667,098 B2
(45) Date of Patent: Jun. 30, 2026

(54) READY TO USE PLANT TREATMENT AGENT APPLICATOR, CONTAINER AND PRODUCT

(71) Applicants: UPL Corporation Limited, Port Louis (MU); UPL Europe LTD, Warrington (GB)

(72) Inventors: Masayasu Fujiyama, Chiba (JP); Jun Kurihara, Chiba (JP)

(73) Assignees: UPL CORPORATION LIMITED, Port Louis (MU); UPL EUROPE LTD, Warrington (GB)

( * ) Notice: Subject to any disclaimer, the term of this patent is extended or adjusted under 35 U.S.C. 154(b) by 0 days.

(21) Appl. No.: 18/841,106

(22) PCT Filed: Feb. 23, 2023

(86) PCT No.: PCT/GB2023/050410
§ 371 (c)(1),
(2) Date: Aug. 23, 2024

(87) PCT Pub. No.: WO2023/161635
PCT Pub. Date: Aug. 31, 2023

(65) Prior Publication Data
US 2025/0280817 A1     Sep. 11, 2025

(30) Foreign Application Priority Data
Feb. 24, 2022     (JP) ................................. 2022-027059

(51) Int. Cl.
*A01M 21/04*     (2006.01)
*A01M 7/00*     (2006.01)
(52) U.S. Cl.
CPC ........ *A01M 21/043* (2013.01); *A01M 7/0046* (2013.01)

(58) Field of Classification Search
CPC ...... A01M 21/043; A01M 7/046; A01M 7/00; A01M 7/0042; A01G 25/14
(Continued)

(56) References Cited

U.S. PATENT DOCUMENTS 1,595,650 A * 8/1926 Edenharder ............ A01G 25/14
239/377
1,661,400 A * 3/1928 Yehle ..................... A01G 25/14
239/377
(Continued)

FOREIGN PATENT DOCUMENTS

CN     205455072 U     8/2016
CN     215745064 U     2/2022
FR     2633489 A1     1/1990

OTHER PUBLICATIONS

International Search Report for International Application No. PCT/GB2023/050410, Date of Mailing: May 3, 2023, 4 pages.
(Continued)

*Primary Examiner* — Zoe Tam Tran
(74) *Attorney, Agent, or Firm* — CANTOR COLBURN LLP

(57)     ABSTRACT

The present invention relates to an applicator for applying a plant treatment agent to a plant via a container, the applicator having: an applicator shell defining an applicator cavity, an applicator cavity inlet end and an applicator cavity outlet end spaced apart from the applicator cavity inlet end by the applicator cavity, and wherein the applicator cavity outlet end defines a linear aperture array, and wherein apertures of the linear aperture array are disposed along an array axis.

20 Claims, 14 Drawing Sheets

(58) Field of Classification Search
  USPC ............................................. 47/1.5; 239/268
  See application file for complete search history.

(56) References Cited

U.S. PATENT DOCUMENTS

| | | | | |
|---|---|---|---|---|
| 1,702,523 | A | * | 2/1929 | Schafer .................. A01G 25/14 239/377 |
| 2,965,310 | A | * | 12/1960 | Gettelman ............. A01G 25/14 239/548 |
| 5,915,628 | A | * | 6/1999 | Kreizel .................. A01G 25/14 239/377 |
| 6,014,836 | A | | 1/2000 | Chester |
| 7,765,735 | B1 | | 8/2010 | Carelli |
| 10,442,071 | B1 | * | 10/2019 | Chandlee .................. B08B 3/08 |
| 2007/0138317 | A1 | * | 6/2007 | Lo .......................... A01G 25/14 239/375 |
| 2016/0106025 | A1 | * | 4/2016 | Nelson ................... A01C 5/064 111/164 |
| 2016/0219872 | A1 | * | 8/2016 | Burke .................... A01N 25/30 |
| 2016/0249540 | A1 | * | 9/2016 | Zimmer ................. A01G 25/14 239/377 |

OTHER PUBLICATIONS

Written Opinion for International Application No. PCT/GB2023/ 050410, Date of Mailing: May 3, 2023, 10 pages.

* cited by examiner

Applicator 100

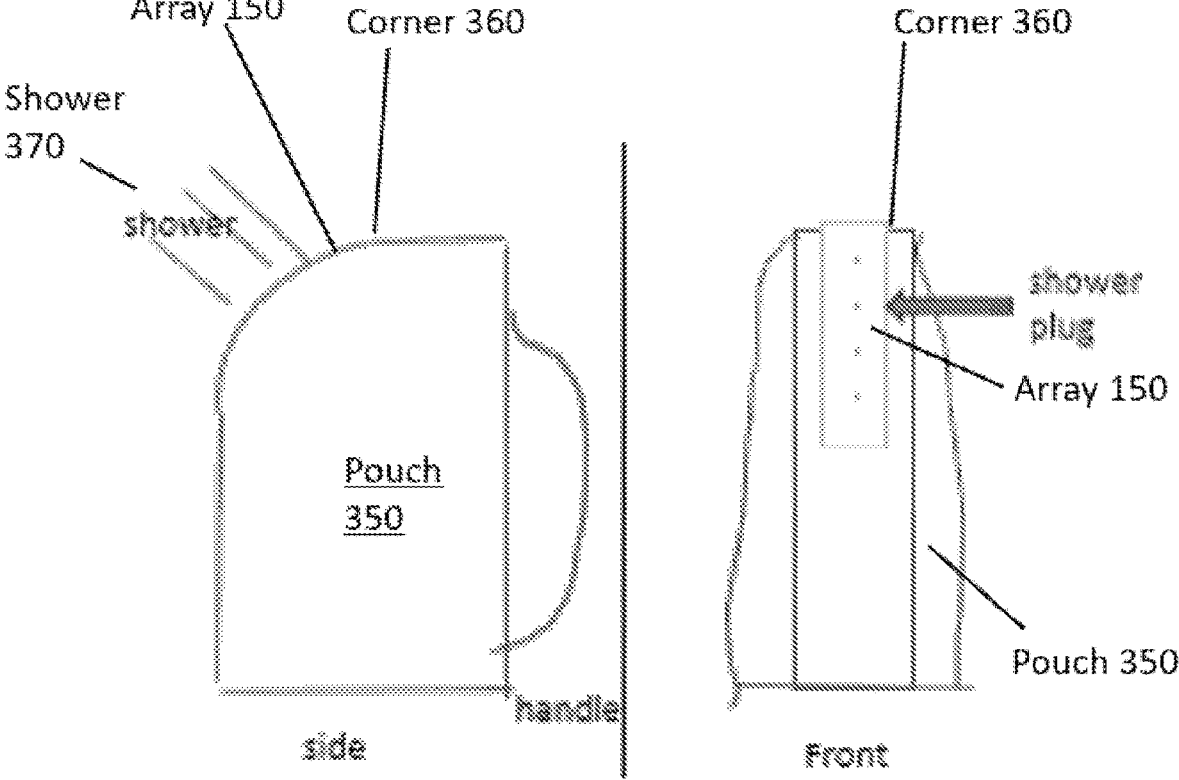
FIG. 4                    FIG. 5

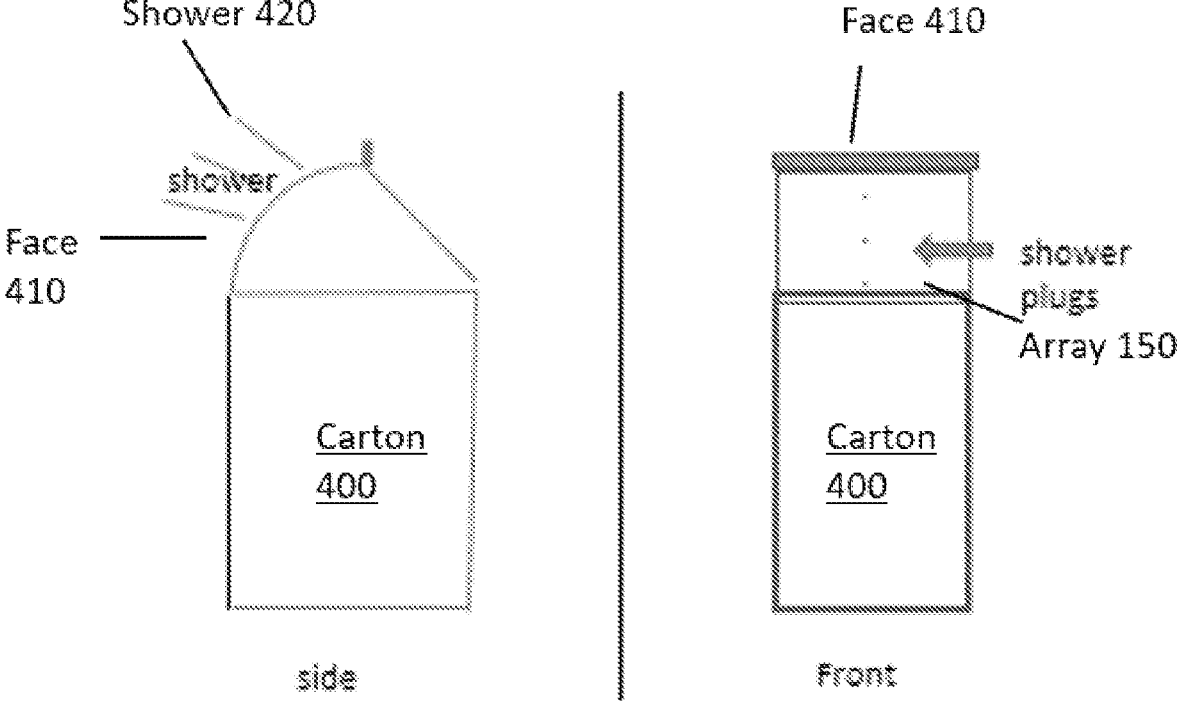
FIG. 6                              FIG. 7 start obtaining the container at least
partially filled with product                    1010 pouring the product out of the applicator, via
the linear aperture array, and onto the plant    1020 end

READY TO USE PLANT TREATMENT AGENT APPLICATOR, CONTAINER AND PRODUCT

CROSS REFERENCE TO RELATED APPLICATIONS

This application is a U.S National Stage application of PCT/GB2023/050410, filed Feb. 23, 2023, which claims the benefit of Japan Patent Application No. 2022-027059 filed Feb. 24, 2022, both of which are incorporated by reference in their entireties herein.

FIELD OF THE DISCLOSURE

The present disclosure is related to ready to use plant treatment agent applicators, containers, products, and methods of use of the same.

BACKGROUND

Ready to Use (RTU) herbicide products are popular for the home and garden user market because the spraying equipment allows spraying without dilution of the herbicide so that the user can easily spray the product without getting their hands dirty. Another advantage of ready to use products is that the user need not have extensive knowledge about the dose or concentration of product for application, thus, allowing the common man to use these products.

Glyphosate RTU is a popular product as it is effective with a low spray volume. Advantageously, as a systemic acting absorption-transfer herbicide, glyphosate absorbs through the leaves and/or stems of the plant and travels internally though the plant. However, glyphosate, an absorption-transfer herbicide, provides slow killing of weeds. In addition, glyphosate-resistant weeds such as goose grass, Italian ryegrass, hairy fleabane and horse weed are problematic as it the low weed efficacy of glyphosate on nuisance weeds of field horsetail, ivy leaf morning glory, Asiatic dayflower, and the like. Thus, low spray, fast-acting, broadly effective alternatives to glyphosate RTU are needed.

Glufosinate RTU (GA RTU), a contact killer herbicide, provides fast burndown activity due to its quick penetration of plant tissue. Also, glufosinate provides excellent weed efficacy on glyphosate-resistant weeds and the nuisance weeds for glyphosate RTU. A disadvantage of glufosinate RTU is a requirement for a high spray volume as glyphosate is a contact killer herbicide which only kills weeds that it directly contacts. For example, glufosinate RTU is registered at a 1000 L/ha spray volume for general weed control, while glyphosate RTU, a systemic herbicide, is registered at a 150-300 L/ha spray volume for general weed control.

What is needed are alternative compositions and spraying methods for ready to use formulations of plant treatment agents such as glufosinate RTU. There is also a need in the art for effective applicators which allow better spraying efficiency and consequently better pest control. There is also a need in the art for ready to use products which does not require highly specialized equipment and which can be easily used by the farmers or home-gardeners. There is a need for product which achieves maximum control with lesser amounts of product.

The invention disclosed in the present disclosure aims to satisfy these needs. It is an object of the resent disclosure to provide ready to use products which can be easily used and applied with novel applicator which aims to achieve higher control with lesser product.

BRIEF SUMMARY

Disclosed is an applicator for applying a plant treatment agent via a container, the applicator including: an applicator shell defining an applicator cavity, an applicator cavity inlet end and an applicator cavity outlet end spaced apart from the applicator cavity inlet end by the applicator cavity, and wherein the applicator cavity outlet end defines a linear aperture array, and wherein apertures of the linear aperture array are disposed along an array axis.

In addition to one or more of the above disclosed aspects of the applicator, or as an alternate, the linear aperture array has an array length that is between 90% and 100% of an end to end span of the applicator cavity outlet end along the array axis.

In addition to one or more of the above disclosed aspects of the applicator, or as an alternate the linear aperture array has a discrete center array portion, defining a discrete set of apertures surrounding a linear center of the linear aperture array and that are centered on the array axis.

In addition to one or more of the above disclosed aspects of the applicator, or as an alternate the discrete center array portion extends between 10% and 30% of the array length of the linear aperture array and is symmetric about the array axis.

In addition to one or more of the above disclosed aspects of the applicator, or as an alternate the discrete center array portion has a widthwise span that is the same as its lengthwise span.

In addition to one or more of the above disclosed aspects of the applicator, or as an alternate each aperture in the linear aperture array has a same size and shape as each other.

In addition to one or more of the above disclosed aspects of the applicator, or as an alternate the applicator shell: extends along a shell-length axis from the applicator cavity inlet end to the applicator cavity outlet end; diverges along a shell-width axis that is perpendicular to the shell-length axis from the applicator cavity inlet end to the applicator cavity outlet end; and converges relative to a shell-thickness axis that is perpendicular to the shell-length axis and the shell-width axis from the applicator cavity inlet end to the applicator cavity outlet end, such that an outer boundary of the applicator cavity outlet end defines a narrow-elongate portion of the applicator, and to thereby define a flat end nozzle.

In addition to one or more of the above disclosed aspects of the applicator, or as an alternate the applicator cavity outlet end defines a circular plate.

In addition to one or more of the above disclosed aspects of the applicator, or as an alternate the applicator shell defines an applicator neck portion extending away from the applicator cavity inlet end along an applicator neck axis to an applicator neck inlet end.

In addition to one or more of the above disclosed aspects of the applicator, or as an alternate the applicator neck portion is cylindrical having an applicator inlet diameter at the applicator neck inlet end that is larger than a total aperture area defined by the linear aperture array.

In addition to one or more of the above disclosed aspects of the applicator, or as an alternate the applicator includes a plant treatment agent product stored in the applicator cavity.

In an embodiment, the plant treatment agent may be selected from a group consisting of a herbicide, fungicide, insecticide and a combination thereof.

Further disclosed is a container for distributing a plant treatment agent to a plant, including: a container shell defining: a container cavity that is capable of storing any fluid; a container cavity inlet end for receiving the product; a container cavity outlet end, and a container neck extends away from the container cavity outlet end along a container neck axis to a container neck outlet end; and an applicator having one or more of the above disclosed aspects, wherein the container neck is operationally coupled with the applicator neck portion so that the product in the container cavity is configured to flow into the applicator and out of the linear aperture array.

In addition to one or more of the above disclosed aspects of the container, or as an alternate the container neck and the applicator neck are formed of a continuous material.

In addition to one or more of the above disclosed aspects of the container, or as an alternate the container neck has a shape that is complementary with the shape of the applicator neck such that the applicator neck fits against the container neck via a fit selected from group consisting of clamp fit, thread fit, slip fit and snap fit.

In addition to one or more of the above disclosed aspects of the container, or as an alternate, the container includes a plant treatment agent disposed in the applicator cavity or the container cavity.

Further disclosed is a method of applying a plant treatment agent to a plant, including: obtaining a container, having one or more of the above disclosed aspects; and applying the plant treatment agent out of the applicator, via the linear aperture array, and onto the plant.

BRIEF DESCRIPTION OF THE DRAWINGS

FIG. 1H shows a bottom perspective view of the embodiment of FIG. 1C.

FIG. 1I shows another bottom perspective view of the embodiment of FIG. 1C.

FIG. 1J shows another embodiment of a shower plug shaped applicator as a diverging nozzle with a round end having a linear aperture array.

FIG. 4 shows a side view of the pouch that defines a container and applicator with a shower of product mixed with water being expressed therefrom.

FIG. 5 shows an end view of the pouch of FIG. 4 showing the aperture array.

FIG. 6 shows a side view of the pouch that defines the container and applicator with a shower of product mixed with water being expressed therefrom.

FIG. 7 shows a front view of the pouch of FIG. 6 showing the aperture array.

Figure 1A:
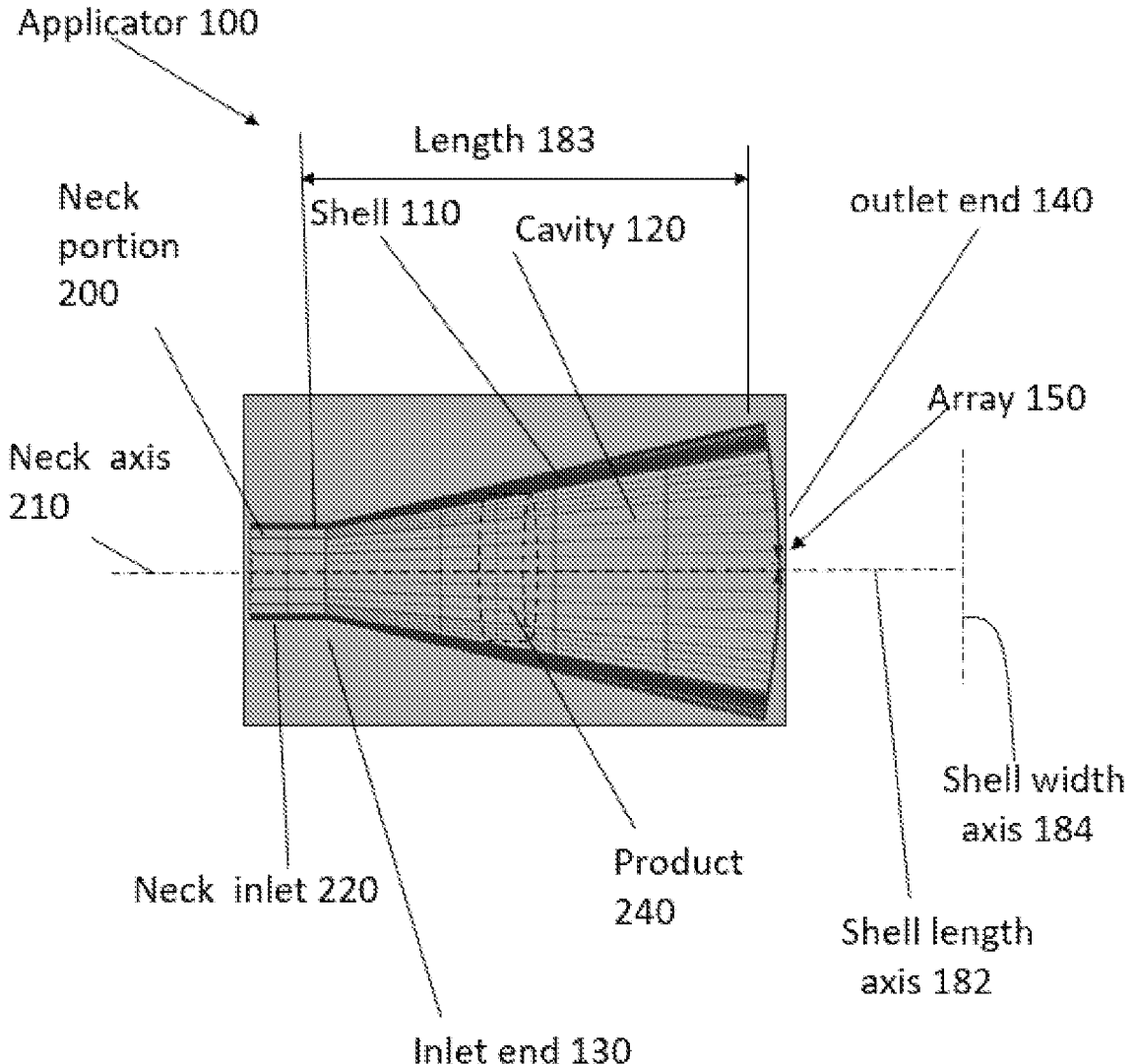
FIG. 1A shows an embodiment of a shower plug shaped applicator that as a diverging nozzle with a flat end having a linear aperture array.

The above-described and other features will be appreciated and understood by those skilled in the art from the following detailed description, drawings, and appended claims.

DETAILED DESCRIPTION

As described herein, the inventors have determined that a low spray volume technique is a labor-saving technique for application of plant treatment agents (hereinafter interchangeably referred to as "product"), particularly for herbicide application of RTU formulations as described herein. An object was to develop RTU formulations of plant treatment agents. Of particular relevance, an object was to develop glufosinate RTU formulations and spraying methods that would allow the contact killer glufosinate to be sprayed in the same volume as the absorption transfer herbicide glyphosate available commercially. It is to be appreciated that the disclosed embodiments are not limited to the application of glufosinate, and the plant treatment agent may be more broadly construed as any treatment or any agent that can be distributed via the disclosed applicator(s), container(s), or combinations thereof.

As used herein, the term "Glufosinate" refers to any molecule which is a racemic phosphinico amino acid or a salt thereof. The term also includes forms and isomers of glufosinate such as racemic mixtures, glufosinate-p (L-glufosinate), D-glufosinate, and sodium, potassium or ammonium salts thereof. The term can generically refer to any form of glufosinate or its salt such as free form, solvates, hydrates, anhydrous form, polymorph forms, pseudo polymorph forms, amorphous form or mixture thereof.

Disclosed is an applicator for applying a plant treatment agent via a container, the applicator including: an applicator shell defining an applicator cavity, an applicator cavity inlet end and an applicator cavity outlet end spaced apart from the applicator cavity inlet end by the applicator cavity, and wherein the applicator cavity outlet end defines a linear aperture array, and wherein apertures of the linear aperture array are disposed along an array axis.

In an embodiment, the plant treatment agent may be selected from fertilizers, mycorrhiza, micronutrients, acaricides, algicides, antifeedants, avicides, bactericides, bird repellents, chemosterilants, fungicides, herbicide safeners, herbicides, insect attractants, insect repellents, insecticides, mammal repellents, mating disruptors, molluscicides, nematicides, plant activators, plant-growth regulators, rodenticides, synergists, virucides, derivatives thereof, biological control agents, superabsorbent polymers and mixtures thereof.

In an embodiment, the plant treatment agent is an herbicide, fungicide, insecticide, or a combination thereof.

In an embodiment, the plant treatment agent is a herbicide selected from: 2,4-D, acetochlor, aclonifen, amicarbazone, 4-aminopieolinic acid based herbicides, such as halauxifen, halauxifen-methyl, 4-amino-3-chloro-6-(4-chloro-2-fluoro-3-methoxyphenyl)-5fluoropyridine-2-carboxylic acid or an agriculturally acceptable ester or salt thereof, and those described in U.S. Pat. Nos. 7,314,849 and 7,432,227 to Balko, et al., amidosulfuron, aminocyclopyrachlor, aminopyralid, aminotriazole, ammonium thiocyanate, anilofos, asulam, azimsulfnron, atrazine, beflubutamid, benazolin, benfuresate, bensulfuron-methyl, bentazon-sodium, benzofenap, bifenox, bispyribacsodium, bromobutide, bromacil, bromoxynil, butachlor, butafenacil, butralin, butroxydim, carbetamide, cafenstrole, carfentrazone, carfentrazoneethyl, chlormequat, clopyralid, chlorsulfuron, chlortoluron, cinidon-ethyl, clethodim, clodinafop-propargyl, clomeprop, clomazone, cloransulam-methyl, cyanazine, cyclopyrimorate, cyclosulfamuron, cycloxydim, cyhalofop-butyl, daimuron, dicamba, dichlobenil, dichlorprop-P, diclofopmethyl, diclosulam, diflufenican, diflufenzopyr, dimefuron, dimethachlor, diquat, diuron, 5-ethyl dipropylcarbamothioate (EPTC), esprocarb, ethoxysulfuron, etobenzanid, fenoxaprop, fenoxaprop-ethyl, fenoxapropethyl+isoxadifenethyl, fenoxaprop-P-ethyl, fenoxasulfone, fenquinotrione, fentrazamide, flazasulfuron, florasulam, fluazifop, fluazifop-P-butyl, flucarbazone, flucarbazone-sodium, flucetosulfuron (LGC-42153), flufenacet, flumetsulam, flumioxazin, flupyrsulfuron, flurochloridone, fluroxypyr, fluroxypyr-meptyl, flurtamone, glufosinate, glufosinate-ammonium, glyphosate, halosulfuron-methyl, haloxyfop-methyl, haloxyfop-R-methyl, hexazinone, imazamethabenz, imazamox, imazapic, imazapyr, imazaquin, imazethapyr, imazosulfuron, indanofan, indaziflam, iodosulfuron, iodosulfuron-ethyl-sodium, iofensulfuron, ioxynil, ipfencarbazone, isoproturon, isoxaben, isoxaflutole, lactofen, linuron, MCPA, MCPB, mecoprop-P, mefenacet, mesosulfuron, mesosulfuron-ethyl sodium, mesotrione, metamifop, metazochlor, metazosulfuron, metosulam, metribuzin, metsulfuron, metsulfuronmethyl, molinate, MSMA, napropamide, napropamide-M, orfurazon, orthosulfamuron, oryzalin, oxadiargyl, oxadiazon, oxazichlomefone, oxyfluorfen, paraquat, pendimethalin, penoxsulam, pentoxazone, pethoxamid, picloram, picolinafen, pinoxaden, pretilachlor, primisulfuron, profluazol, profoxydim, propanil, propaquizafop, propyrisulfuron, propoxycarbazone, propyzamide, prosulfocarb, prosulfuron, pyraclonil, pyraflufen-ethyl, pyrasulfotole, pyrazosulfuronethyl, pyrazolynate, pyribenzoxim (LGC-40863), pyributicarb, pyridate, pyriftalid, pyrimisulfan, pyroxsulam, pyroxasulfone, quinclorac, quinmerac, quizalofop-ethyl-D, quizalofop-P-ethyl, quizalofop-P-tefuryl, rimsulfuron, sethoxydim, simazine, sulcotrione, sulfentrazone, sulfometuron, sulfosate, sulfosulfuron, tebuthiuron, tefuryltrione, tepraloxidim, terbacil, terbuthylazine, terbutryn, thenylchlor, thiazopyr, thifensulfuron, thifensulfuron-methyl, thiobencarb, topramezone, tralkoxydim, triafamone, triasulfuron, tribenuron, tribenuron-methyl, triafamone, triclopyr, and trifluralin, and agriculturally acceptable salts, choline salts, esters and mixtures thereof. In certain embodiments, the additional pesticide includes benzofenap, cyhalofop (e.g., cyhalofop-butyl), daimuron, pentoxazone, esprocarb, pyrazosulfuron, butachlor, pretilachlor, metazosulfuron, bensulfuron-methyl, imazosulfuron, azimsulfuron, bromobutide, benfuresate, mesotrione, sulcotrione, oxazichlomefone, triafamone, cyclopyrimorate, pyrimisulfan, propyrisulfuron, pyraclonil, ipfencarbazone, iofensulfuron, fenoxasulfone, fenquinotrione, napropamide-M, imazamox, imazapic, imazethapyr, pyroxsulam, and agriculturally acceptable salts or esters thereof, or combinations thereof.

In a preferred embodiment, the herbicide is glufosinate.

In an embodiment, the plant treatment agent is an insecticide selected from: Alanycarb, Aldicarb, Bendiocarb, Benfuracarb, Butocarboxim, Butoxycarboxim, Carbaryl, Carbofuran, Carbosulfan, Ethiofencarb, Fenobucarb, Formetanate, Furathiocarb, Isoprocarb, Methiocarb, Methomyl, Metolcarb, Oxamyl, Pirimicarb, Propoxur, Thiodicarb, Thiofanox, Triazamate, Trimethacarb, XMC, Xylylcarb, Acephate, Azamethiphos, Azinphos-ethyl, Azinphosmethyl, Cadusafos, Chlorethoxyfos, Chlorfenvinphos, Chlormephos, Chlorpyrifos, Chlorpyrifos-methyl, Coumaphos, Cyanophos, Demeton-S-methyl, Diazinon, Dichlorvos/DDVP, Dicrotophos, Dimethoate, Dimethylvinphos, Disulfoton, EPN, Ethion, Ethoprophos, Famphur, Fenamiphos, Fenitrothion, Fenthion, Fosthiazate, Heptenophos, Imicyafos, Isofenphos, Isopropyl O-(methoxyaminothio-phosphoryl) salicylate, Isoxathion, Malathion, Mecarbam, Methamidophos, Methidathion, Mevinphos, Monocrotophos, Naled, Omethoate, Oxydemeton-methyl, Parathion, Parathionmethyl, Phenthoate, Phorate, Phosalone, Phosmet, Phosphamidon, Phoxim, Pirimiphos-methyl, Profenofos, Propetamphos, Prothiofos, Pyraclofos, Pyridaphenthion, Quinalphos, Sulfotep, Tebupirimfos, Temephos, Terbufos, Tetrachlorvinphos, Thiometon, Triazophos, Trichlorfon, Vamidothion, Chlordane, Endosulfan, Ethiprole, Fipronil, Acrinathrin, Allethrin, d-cis-trans Allethrin, d-trans Allethrin, Bifenthrin, Bioallethrin, Bioallethrin Scyclopentenyl isomer, Bioresmethrin, Cycloprothrin, Cyfluthrin, beta-Cyfluthrin, Cyhalothrin, lambdaCyhalothrin, gamma-Cyhalothrin, Cypermethrin, alpha-Cypermethrin, beta-Cypermethrin, thetacypermethrin, zeta-Cypermethrin, Cyphenothrin, (1R)-trans-isomers], Deltamethrin, Empenthrin (EZ)-(1R)-isomers], Esfenvalerate, Etofenprox, Fenpropathrin, Fenvalerate, Flucythrinate, Flumethrin, tau-Fluvalinate, Halfenprox, Imiprothrin, Kadethrin, Permethrin, Phenothrin [(1R)-trans-isomer], Prallethrin, Pyrethrins (pyrethrum), Resmethrin, Silafluofen, Tefluthrin, Tetramethrin, Tetramethrin [(1R)-isomers], Tralomethrin, Transfluthrin, DDT, Methoxychlor, Acetamiprid, Clothianidin, Dinotefuran, Imidacloprid, Nitenpyram, Thiacloprid, Thiamethoxam, Nicotine, Sulfoxaflor, Flupyradifurone, Triflumezopyrim, Spinetoram, Spinosad, Abamectin, Emamectin benzoate, Lepimectin, Milbemectin, Hydroprene, Kinoprene, Methoprene, Fenoxycarb, Pyriproxyfen, Methyl bromide and other alkyl halides, Chloropicrin, Cryolite (Sodium aluminum fluoride), Sulfuryl fluoride, Borax, Boric acid, Disodium octaborate, Sodium borate, Sodium metaborate, Tartar emetic, Dazomet, Metam, Pymetrozine, Pyrifluquinazon, Afidopyropen, Clofentezine, Diflovidazin, Hexythiazox, Etoxazole, *Bacillus thuringiensis* subsp. *Israelensis, Bacillus thuringiensis* subsp. *Aizawai, Bacillus thuringiensis* subsp. *Kurstaki, Bacillus thuringiensis* subsp. *Tenebrionis*, B.t. crop proteins: (* Please see footnote) Cry1Ab, Cry1Ac, Cry1Fa, Cry1A.105, Cry2Ab, Vip3A, mCry3A, Cry3Ab, Cry3Bb, Cry34Ab1/Cry35Ab1, *Bacillus sphaericus*, Diafenthiuron, Azocyclotin, Cyhexatin, Fenbutatin oxide, Propargite, Tetradifon, Chlorfenapyr, DNOC, Sulfluramid, Bensultap, Cartap hydrochloride, Thiocyclam, Thiosultapsodium, Bistrifluron, Chlorfluazuron, Diflubenzuron, Flucycloxuron, Flufenoxuron, Hexaflumuron, Lufenuron, Novaluron, Noviflumuron, Teflubenzuron, Triflumuron, Buprofezin, Cyromazine, Chromafenozide, Halofenozide, Methoxyfenozide, Tebufenozide, Amitraz, Hydramethylnon, Acequinocyl, Fluacrypyrim, Bifenazate, Fenazaquin, Fenpyroximate, Pyridaben, Pyrimidifen, Tebufenpyrad, Tolfenpyrad, Rotenone (Derris), Indoxacarb, Metaflumizone, Spirodiclofen, Spiromesifen, Spiropidion, Spirotetramat, Aluminium phosphide, Calcium phosphide, Phosphine, Zinc phosphide, Calcium cyanide, Potassium cyanide, Sodium cyanide, Cyenopyrafen, Cyflumetofen, Pyflubumide, Chlorantraniliprole, Cyantraniliprole, Cyclaniliprole Flubendiamide, Tetraniliprole, Flonicamid, Broflanilide, Fluxametamide, *Cydia pomonella* GV, *Thaumatotibia leucotreta* GV, *Anticarsia gemmatalis* MNPV, *Helicoverpa*

*armigera* NPV, GS-omega/kappa HXTX-Hv1a peptide, Azadirachtin, Benzoximate, Bromopropylate, Chinomethionat, Dicofol, Lime sulfur, Mancozeb, Pyridalyl, Sulfur, *Burkholderia* spp, *Wolbachia pipientis* (Zap), *Chenopodium ambrosioides* near *ambrosioides* extract, Fatty acid monoesters with glycerol or propanediol Neem oil, *Beauveria bassiana* strains, Metarhizium anisopliae strain F52, *Paecilomyces* fumosoroseus Apopka strain 97, Diatomaceous earth.

In an embodiment, the plant treatment agent is a fungicide selected from: (3-ethoxypropyl) mercury bromide, 2-methoxyethylmercury chloride, 2-phenylphenol, 8-hydroxyquinoline sulfate, 8-phenylmercurioxyquinoline, acetate, acibenzolar, acypetacs, acypetacs-copper, acypetacs-zinc, albendazole, aldimorph, allicin, allyl alcohol, ametoctradin, aminopyrifen, amisulbrom, amobam, ampropylfos, anilazine, asomate, aureofungin, azaconazole, azithiram, azoxystrobin, barium polysulfide, basic copper carbonate, basic copper sulfate, benalaxyl, benalaxyl-M, benodanil, benomyl, benquinox, bentaluron, benthiavalicarb, benthiazole, benzalkonium chloride, benzamacril, benzamorf, benzohydroxamic acid, benzovindiflupyr, berberine, bethoxazin, bifujunzhi, binapacryl, biphenyl, bitertanol, bithionol, bixafen, blasticidin-S, Bordeaux mixture, boscalid, bromothalonil, bromuconazole, bupirimate, Burgundy mixture, buthiobate, butylamine, calcium polysulfide, captafol, captan, carbamorph, carbendazim, carbon disulfide, carboxin, carpropamid, carvacrol, carvone, Cheshunt mixture, chinomethionat, chitosan, chlobenthiazone, chloraniformethan, chloranil, chlorfenazole, chlorodinitronaphthalenes, chloroneb, chloropicrin, chlorothalonil, chlorquinox, chlozolinate, climbazole, clotrimazole, copper acetate, copper hydroxide, copper naphthenate, copper oleate, copper oxychloride, copper silicate, copper sulfate, copper zinc chromate, coumoxystrobin, cresol, cufraneb, cuprobam, cuprous oxide, cyanogen, cyazofamid, cyclafuramid, cycloheximide, cyflufenamid, cymoxanil, cypendazole, cyproconazole, cyprodinil, dazomet, DBCP, debacarb, decafentin, dehydroacetic acid, dichlobentiazox, dichlofluanid, dichlone, dichlorophen, dichlozoline, diclobutrazol, diclocymet, diclomezine, dicloran, diethofencarb, diethyl pyrocarbonate, difenoconazole, diflumetorim, dimefluazole, dimetachlone, dimethachlone, dimethirimol, dimethomorph, dimethyl disulfide, dimoxystrobin, diniconazole, diniconazole-M, dinobuton, dinocap, dinocap-4, dinocap-6, dinocton, dinopenton, dinosulfon, dinoterbon, diphenylamine, dipymetitrone, dipyrithione, disulfiram, ditalimfos, dithianon, DNOC, dodemorph, dodicin, dodine, drazoxolon, EBP, edifenphos, enoxastrobin, epoxiconazole, etaconazole, etem, ethaboxam, ethirimol, ethoxyquin, ethylicin, ethylmercury 2,3-dihydroxypropyl mercaptide, ethylmercury acetate, ethylmercury bromide, ethylmercury chloride, ethylmercury phosphate, etridiazole, extract from *Melaleuca alternifolia*, famoxadone, fenamidone, fenaminosulf, fenaminstrobin, fenapanil, fenarimol, fenazaquin, fenbuconazole, fenfuram, fenhexamid, fenitropan, fenjuntong, fenoxanil, fenpiclonil, fenpicoxamid, fenpropidin, fenpropimorph, fenpyrazamine, fentin, ferbam, ferimzone, florylpicoxamid, fluazinam, flubeneteram, fludioxonil, flufenoxystrobin, fluindapyr, flumetover, flumorph, fluopicolide, fluopimomide, fluopyram, fluoroimide, fluotrimazole, fluoxapiprolin, fluoxastrobin, fluquinconazole, flusilazole, flusulfamide, flutianil, flutolanil, flutriafol, fluxapyroxad, folpet, formaldehyde, fosetyl, fuberidazole, furalaxyl, furametpyr, furcarbanil, furconazole, furconazole-cis, furfural, furmecyclox, furophanate, geraniol, glyodin, griseofulvin, guazatine, halacrinate, hexachlorobenzene, hexachlorobutadiene, hexachlorophene, hexaconazole, hexylthiofos, huanjunzuo, hydrargaphen, hymexazol, hymexazole, imazalil, imibenconazole, iminoctadine, inezin, inpyrfluxam, iodocarb, ipconazole, ipfentrifluconazole, ipflufenoquin, iprobenfos, iprobenfos (IBP), iprodione, iprovalicarb, isofetamid, isoflucypram, isoprothiolane, isopyrazam, isotianil, isovaledione, izopamfos, jiaxiangjunzhi, kasugamycin, kejunlin, kresoxim-methyl, mancopper, mancozeb, mandestrobin, mandipropamid, maneb, mebenil, mecarbinzid, mefentrifluconazole, mepanipyrim, mepronil, meptyldinocap, mercuric chloride, mercuric oxide, mercurous chloride, metalaxyl, metalaxyl-M, metam, metazoxolon, metconazole, methasulfocarb, methfuroxam, methyl bromide, methyl iodide, methyl isothiocyanate, methylmercury benzoate, methylmercury dicyandiamide, methylmercury pentachlorophenoxide, metiram, metominostrobin, metrafenone, metsulfovax, metyltetraprole, milneb, moroxydine, myclobutanil, myclozolin, N-(ethylmercury)-p-toluenesulfonanilide, nabam, natamycin, ningnanmycin, nitrostyrene, nitrothal-isopropyl, nuarimol, OCH, octhilinone, ofurace, orysastrobin, osthol, oxadixyl, oxathiapiprolin, oxine-copper, oxolinic acid, oxpoconazole, oxycarboxin, oxyfenthiin, oxytetracycline, parinol, pefurazoate, penconazole, pencycuron, penflufen, pentachlorophenol, pentachlorophenyl laurate, penthiopyrad, phenamacril, phenylmercuriurea, phenylmercury acetate, phenylmercury chloride, phenylmercury derivative of pyrocatechol, phenylmercury nitrate, phenylmercury salicylate, phosdiphen, phthalide, picarbutrazox, picoxystrobin, piperalin, plant oils (mixtures): eugenol, polycarbamate, polyoxins, polyoxorim, polyoxorim-zinc, potassium azide, potassium polysulfide, potassium thiocyanate, probenazole, prochloraz, procymidone, propamidine, propamocarb, propiconazole, propineb, proquinazid, prothiocarb, prothioconazole, pydiflumetofen, pyracarbolid, pyraclostrobin, pyrametostrobin, pyraoxystrobin, pyrapropoyne, pyraziflumid, pyrazophos, pyribencarb, pyridachlometyl, pyridinitril, pyrifenox, pyrimethanil, pyriofenone, pyrisoxazole, pyroquilon, pyroxychlor, pyroxyfur, quinacetol, quinazamid, quinconazole, quinofumelin, quinoxyfen, quintozene, quintozene (PCNB), rabenzazole, saijunmao, saisentong, salicylanilide, sanguinarine, santonin, sedaxane, silthiofam, simeconazole, sodium azide, sodium pentachlorophenate, sodium polysulfide, sodium tetrathiocarbonate, sodium o-phenylphenoxide, spiroxamine, streptomycin, sulfur, sultropen, tebuconazole, tebufloquin, tecloftalam, tecnazene, tecnazene (TCNB), tecoram, tetraconazole, thiabendazole, thiadifluor, thicyofen, thifluzamide, thiochlorfenphim, thiocyanatodinitrobenzenes, thiodiazole-copper, thiomersal, thiophanate, thiophanate-methyl, thioquinox, thiram, tiadinil, tioxymid, tolclofos-methyl, tolfenpyrad, tolnifanide, tolprocarb, tolylfluanid, tolylmercury acetate, triadimefon, triadimenol, triamiphos, triarimol, triazbutil, triazoxide, tribasic copper sulphate, tributyltin oxide, trichlamide, trichlorotrinitrobenzenes, triclopyricarb, tricyclazole, tridemorph, trifloxystrobin, triflumizole, triforine, trimorphamide, triticonazole, uniconazole, uniconazole-P, urbacide, validamycin, valifenalate, vangard, vinclozolin, xinjunan, zarilamid, zinc naphthenate, zinc thiazole, zinc trichlorophenate, zineb, ziram, zoxamide.

In an embodiment, the plant treatment agent may be a diluted, concentrated or a pre-mixed RTU product.

Figure 3:
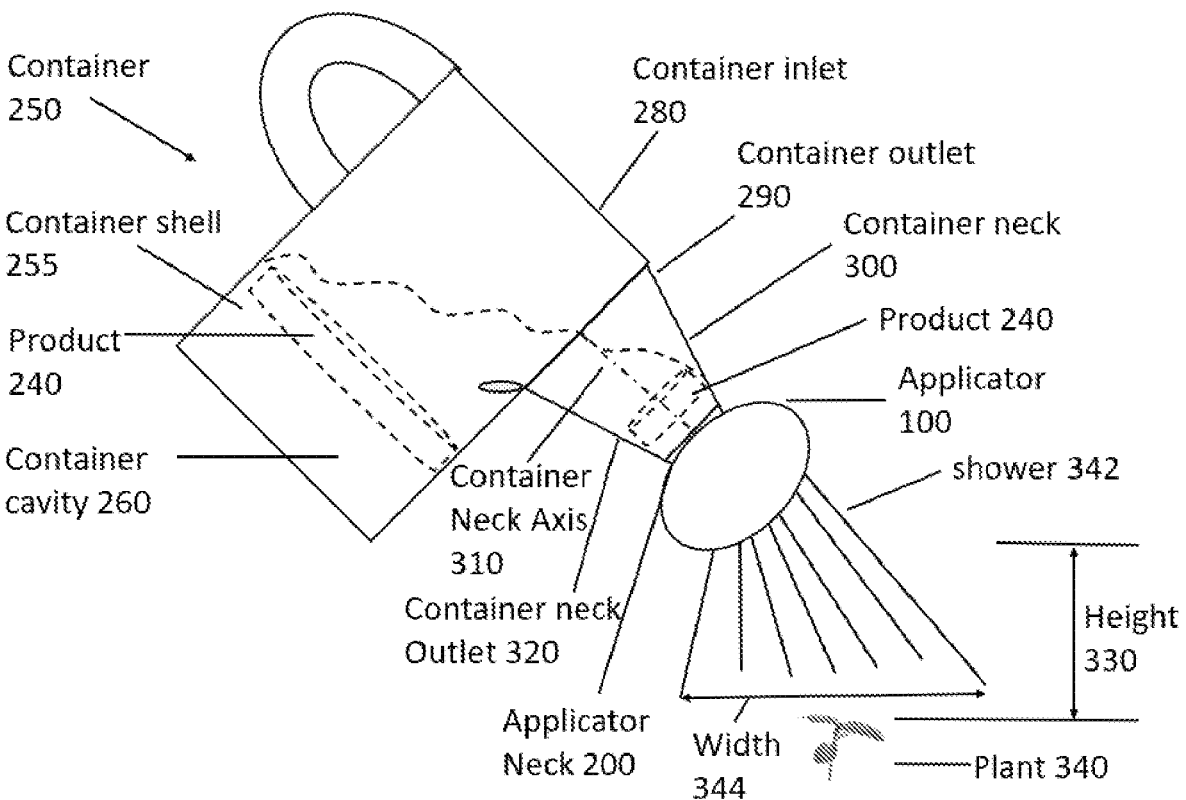
FIG. 3 shows an experimental flat shower plug attached to the spout of a container in the form of a watering can.

In an aspect, rather than a radial spray pattern, it was found that a flat spray pattern is preferable for the plant treatment agents. Thus, turning to FIGS. 1A-1C, an applicator 100 for applying the plant treatment agents is shown, e.g., via a container 250 (FIG. 3). The applicator 100 includes an applicator shell 110 defining an applicator cavity 120. The shell 110 defines an applicator cavity inlet end 130, having a cavity inlet opening, and an applicator cavity outlet end 140 spaced apart from the applicator cavity inlet end 130 by the applicator cavity 120.

Figure 2A:
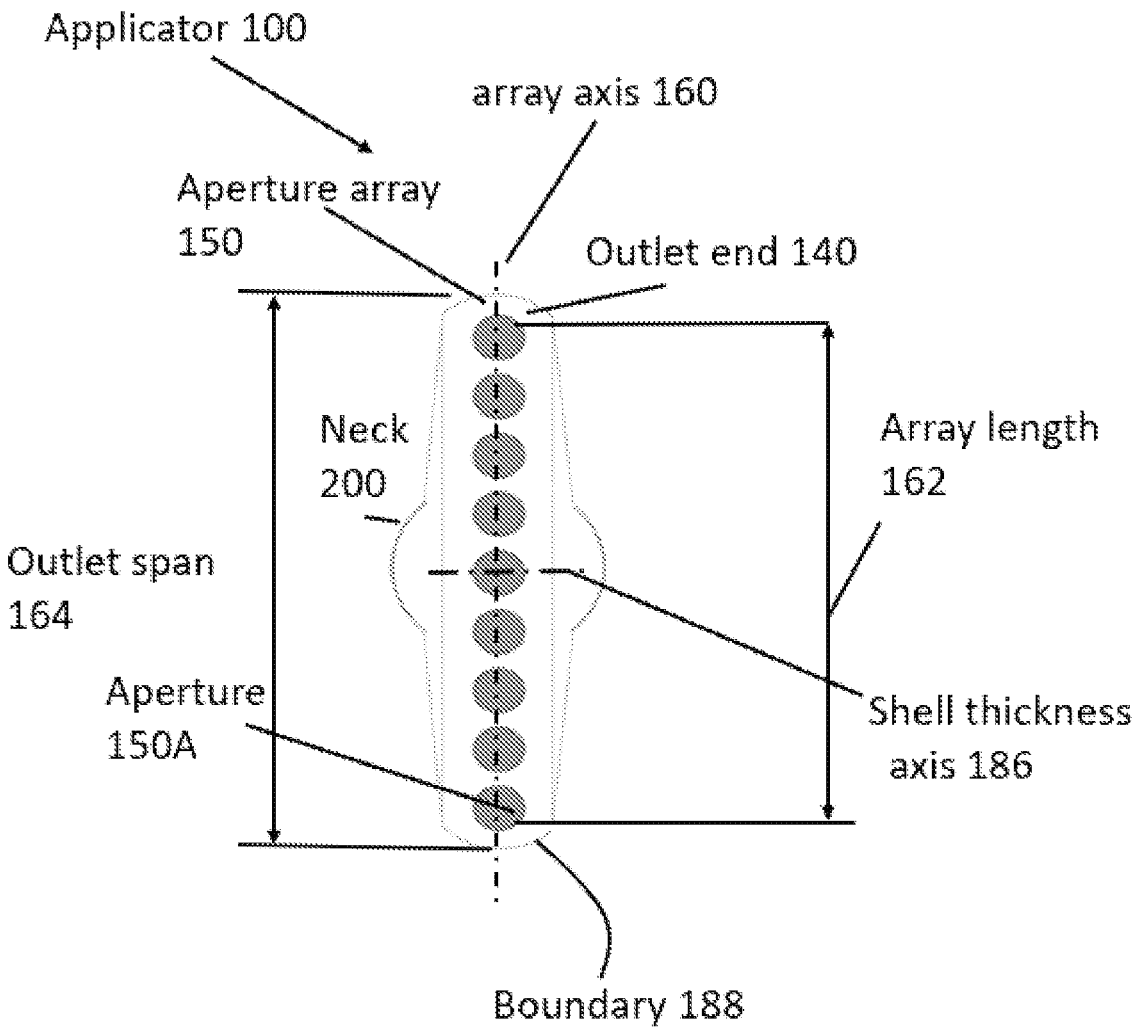
FIG. 2A is another view of the shower plug shaped applicator of FIG. 1A.
Figure 2B:
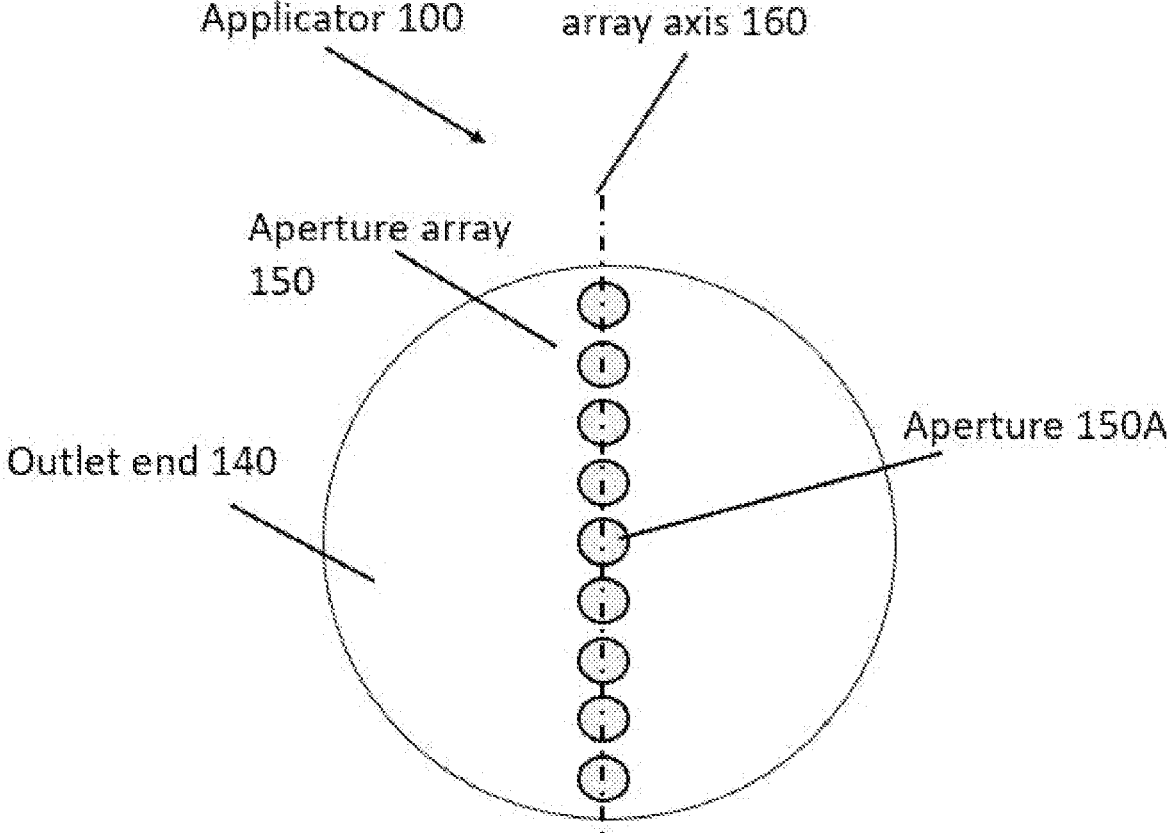
FIG. 2B is another view of the shower plug shaped applicator of FIG. 1B.
Figure 2C:
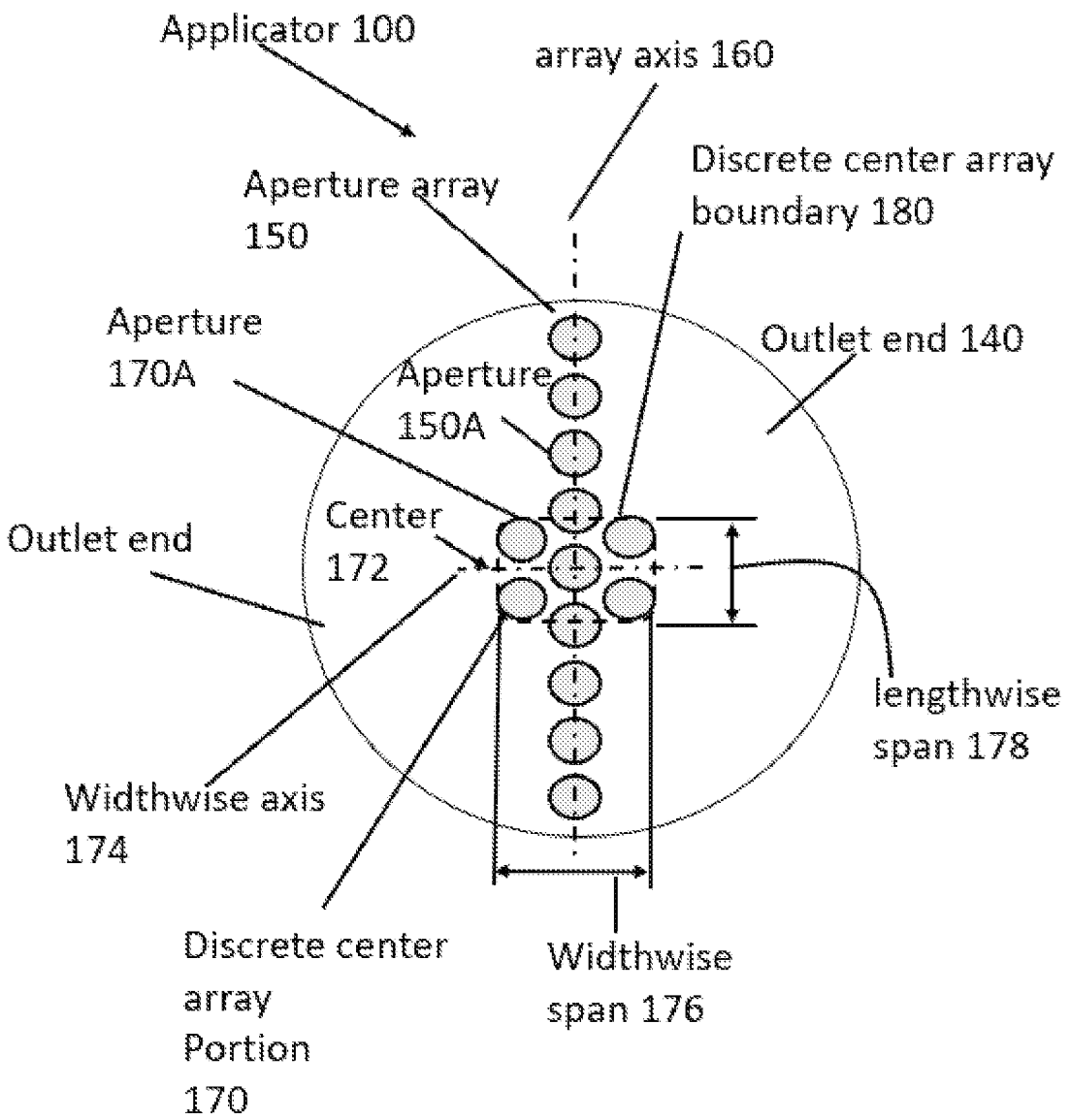
FIG. 2C shows an alternative to the shower plug shaped applicator of FIG. 1B with a discrete cluster of apertures at a linear center of a linear aperture array.

As shown in FIGS. 2A-2C, the applicator cavity outlet end 140 defines a linear aperture array 150 (or flat shower plug) arranged in a linear configuration along an array axis 160. The linear aperture array 150 may have an array length or span 162 that is between 90 and 100% of an end to end length 164 or span of the applicator cavity outlet end 140 along the array axis 160. Each aperture 150A in the linear aperture array 150 may have a same size and shape. For example, each aperture in the linear aperture array is circular or rectangular, or other geometric shape.

As shown in FIG. 2C the linear aperture array 150 define a discrete center array portion 170, which may be a discrete set of apparatuses surrounding a linear center 172 of the linear aperture array 150. The discrete center array portion 170 may be centered on the array axis 160, both lengthwise (along the array axis 160) and widthwise (along widthwise axis 174, at the lengthwise center 172). The discrete center array portion 170 may extend (e.g., cover) between 10% and 30% of the lengthwise span 162 of the linear aperture array 150 and be symmetric about the array axis 160. In one embodiment, the discrete center array portion 170 may have a widthwise span 176 that is the same as its lengthwise span 178. In embodiments, the discrete center array portion 170 may form an array outer boundary 180 that forms a rectangle, square, oval, circle or other geometric shape. Apertures 170A in the discrete center array portion 170 may have a same size and shape as apertures in the linear aperture array 150.

Figure 1B:
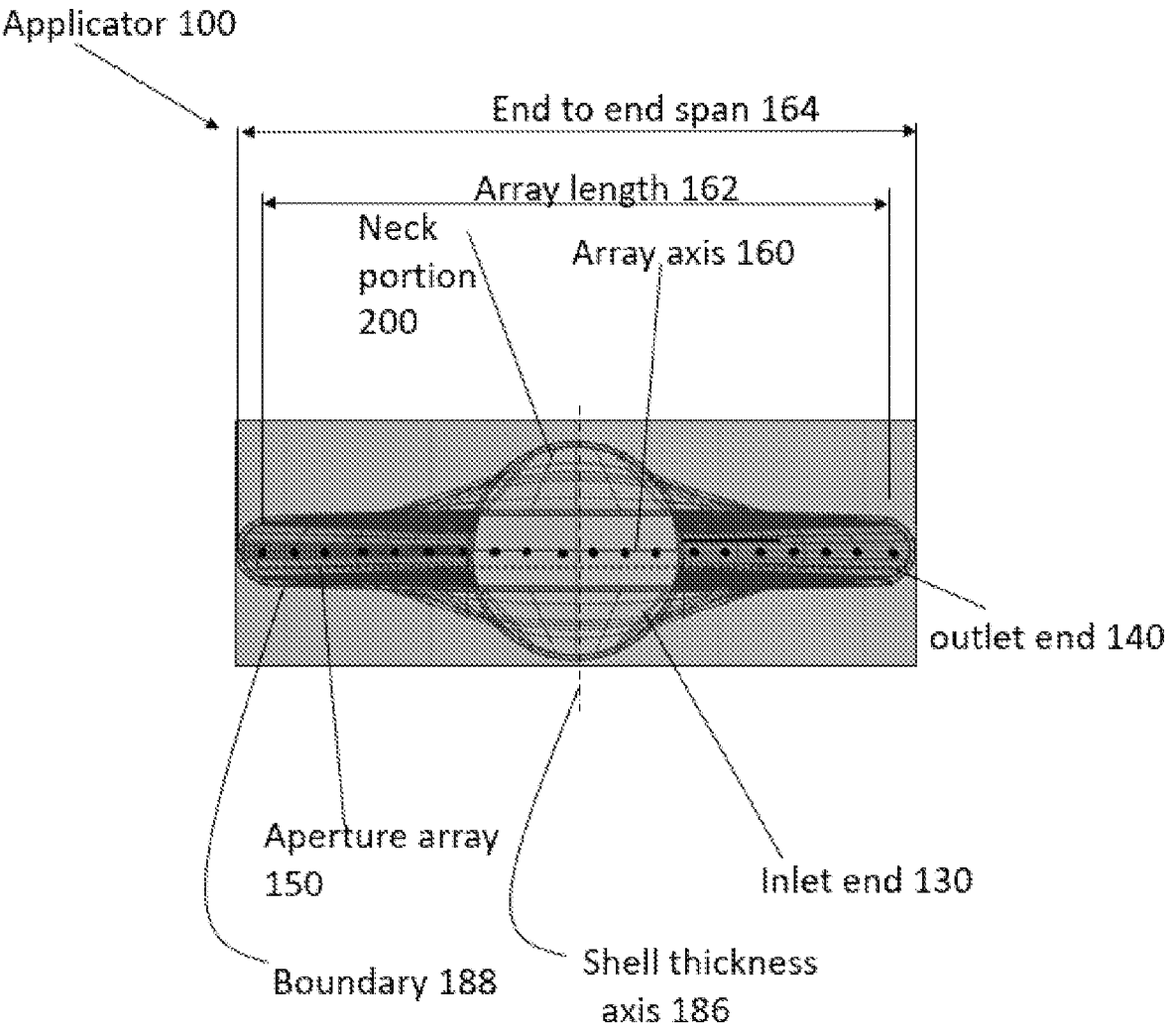
FIG. 1B shows another view of the shower plug shaped applicator of FIG. 1A.

As shown in FIG. 1A in one embodiment the applicator shell 110 extends along a shell-length axis 182 from the applicator cavity inlet end 130 to the applicator cavity outlet end 140 to define its shell length 183. The shape of the shell 110 may diverge along a shell-width axis 184 that is perpendicular to the shell-length axis 182, from the applicator cavity inlet end 130 to the applicator cavity outlet end 140. For the configuration of FIG. 1A, as further shown in FIGS. 1B and 2A, the shape of the shell 110 may converge relative to a shell-thickness axis 186 that is perpendicular to the shell-length axis 182 and the shell-width axis 184, from the applicator cavity inlet end 130 to the applicator cavity outlet end 140. Thus, at the inlet end 130, the applicator 100 has a maximum thickness and minimum width, and at the outlet end 140 the applicator has a minimum thickness and a maximum width (e.g., its outlet span 164). As shown in FIGS. 1B and 2A, with this configuration, an outer boundary 188 of the applicator cavity outlet end 140 defines a narrow-elongated portion of the applicator 100. This configuration defines a flat end nozzle.

FIGS. 1C to 1I show another embodiment of the applicator 190, having a top portion 191, a middle portion 192 and a bottom portion 193, respectively defining a top, middle and bottom passages 191P, 192P, 193P that form a continuous passage 190P. The top portion 191 is similar to the applicator shell 110 and may have a shape that diverges along a shell-width axis 190W that is perpendicular to the shell-length axis 190L, from the applicator inlet end 190A to the middle portion 192. A linear array of apertures 190A may be disposed along a top 191T of the top portion 191.

The middle portion 192 may be rectangular and the bottom portion 193 may be cylindrical. A length of the middle portion 192, along the shell-length axis 190L, may be less than the top portion 191, e.g., between 25% and 75% of the length of the top portion 191. A length of the bottom portion 193, along the shell-length axis 190L, may be between 75% and 125% of the length of the top portion 191. As shown the length of the bottom portion 193 is the same as the top portion 191. A diameter of the bottom portion 193 may be between 75% and 125% of the depth of the middle portion 192, e.g., along the thickness direction 190T.

The middle portion 192 may be offset from a center axis 193C of the bottom portion 193. The bottom portion 193 may have a top surface 193T. A first opening 193T1 in the top surface 193T, where the middle portion 192 and top portion 193 meet, fluidly connects the passages of the middle portion 192 and the top portion 193. The first opening 193T1 may have a size and shape that is complementary to the passage of the middle portion 192.

A top circular opening 193T2 (or second opening), may be defined in the top surface 193T. A stub cylinder 193C may extend inwardly from the top surface 193T of the third portion 193, partially along the length of the third portion 193. The stub cylinder 193C may form an entry channel into the third portion 193 from the top circular opening 193T2. A plug 194 (FIG. 1C) may be provided, which may selectively plug and unplug the top circular opening 193T2 for cleanout or aeration when the nozzle is connected to a hose or container. Thus, the top circular opening 193T2 may be generally referred to as an aeration or cleanout opening.

Utilizing the top circular opening 193T2 may enable the applicator 190, and/or the PET bottle attached to the applicator 190 to regain its shape after either or both of the applicator 190 or PET bottle are pressed to dispense the liquid within. The plug 194 can be a pipe or a tube of variable length with two opposite open ends made of plastic/rubber/similar material. The use of the plug 194 may avoid spillage of contents as air is passed in the applicator 190 and/or to the PET bottle. As indicated the small opening 193T2 may function as aeration opening when dispensing is paused or completed.

The bottom side 193B of the third portion 193 may be without a closure surface to define an opening the size of the passage in the third portion 193. A watering hose or container can connect to the bottom side 193B via the defined opening. It is within the scope of the embodiment to provide hose threads on the inner surface of the third portion 193 to mate with a garden hose, or on an outer surface to fit within a container opening (not shown). That is, the PET bottle maybe threaded or clamped to the opening defined by the bottom of the third portion 193.

Figure 1C:
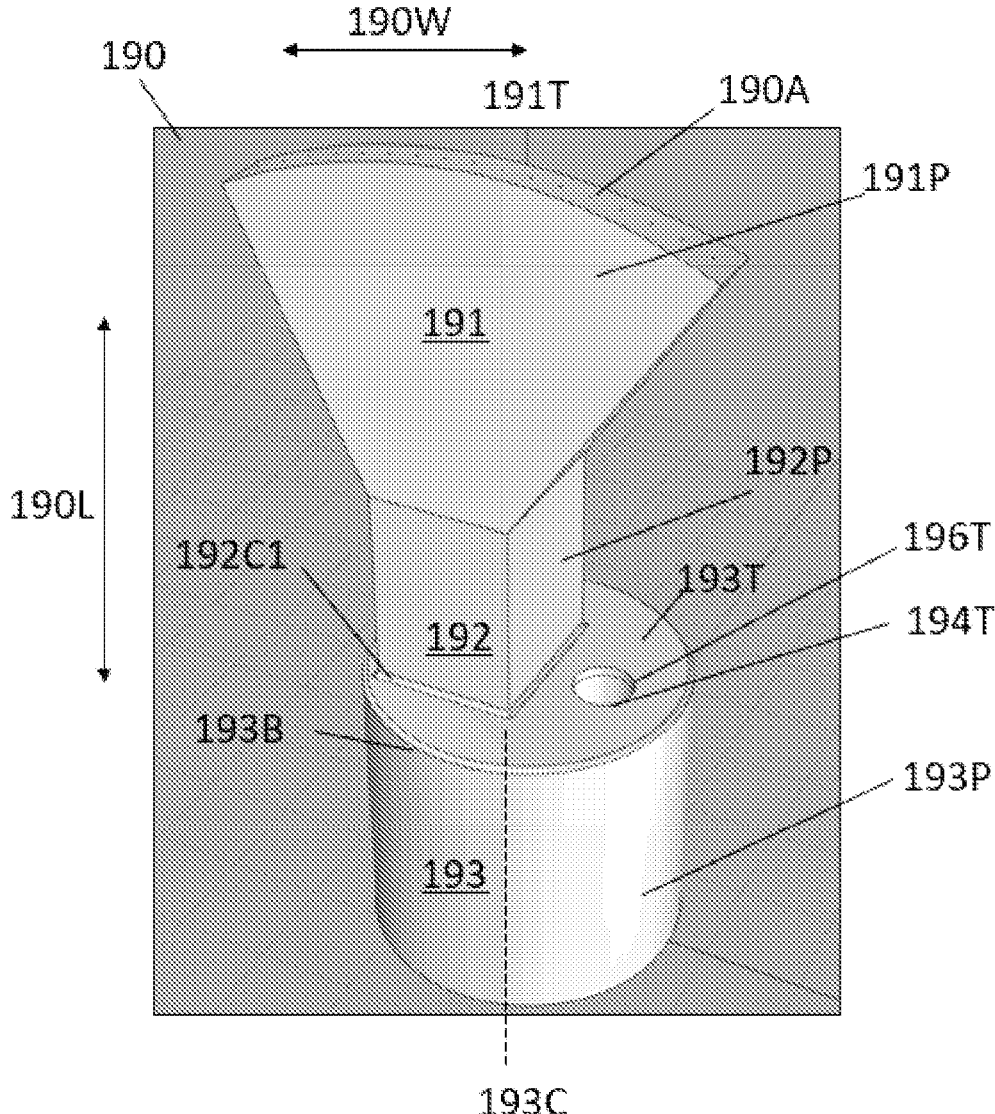
FIG. 1C shows a top perspective view of an embodiment of a shower plug shaped applicator that as a diverging nozzle with a flat end having a linear aperture array, a rectangular neck, and a cylindrical base.
Figure 1D:
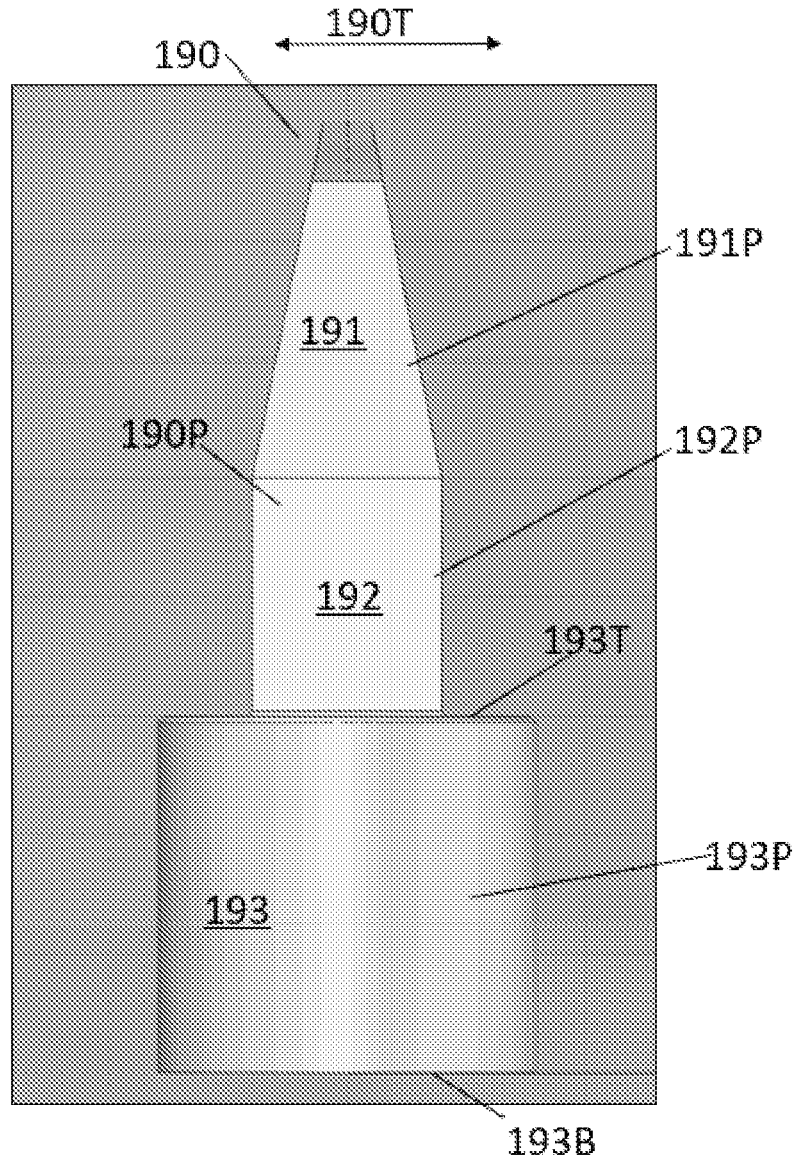
FIG. 1D shows a side view of the embodiment of FIG. 1C.
Figure 1E:
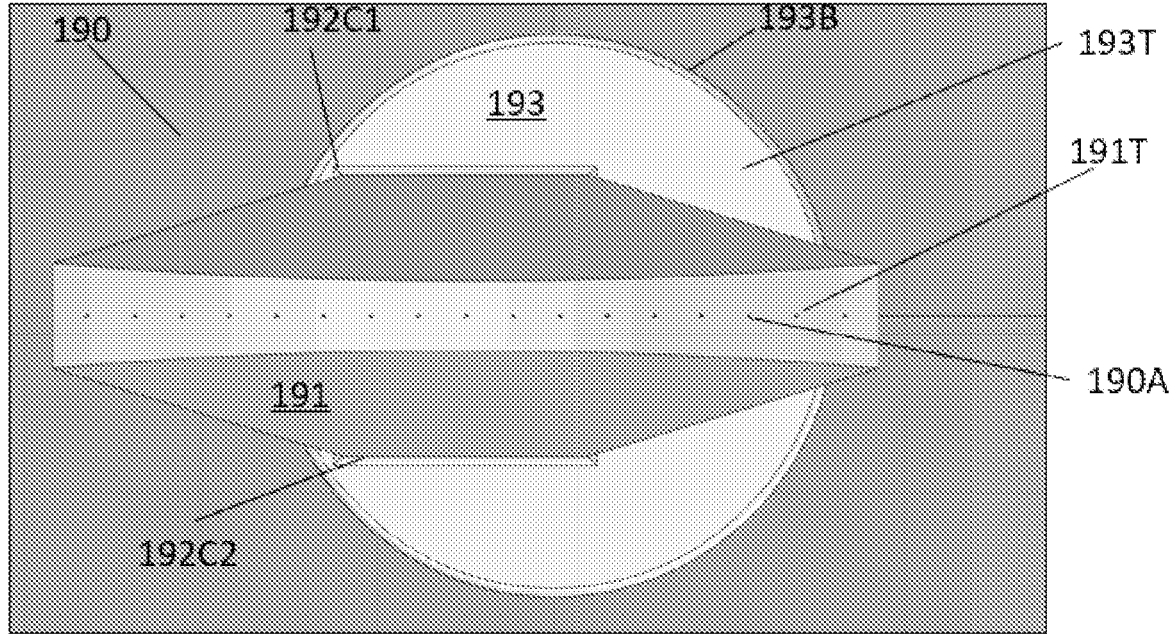
FIG. 1E shows a top view of the embodiment of FIG. 1C.
Figure 1F:
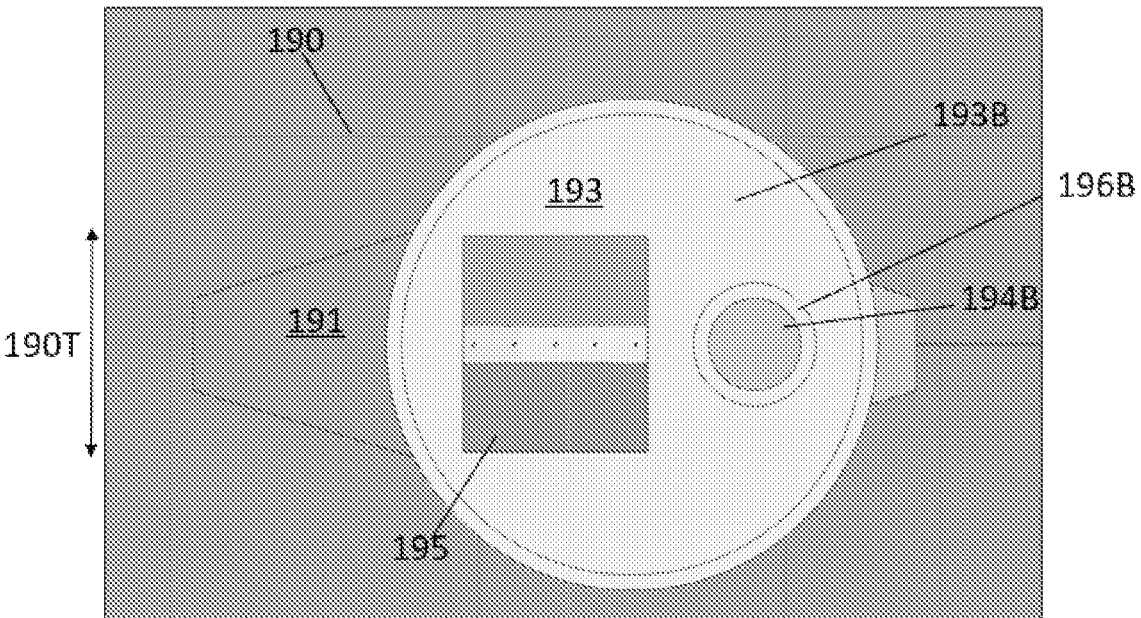
FIG. 1F shows another top perspective view of the embodiment of FIG. 1C.

As shown in FIGS. 1A and 1C, product 240, such as a plant treatment agent, may be stored within any portion of the applicator 190 (see FIG. 1A as a non-limiting example). The agent 240 may be a rounded or squared disc but that is not intended on limiting the scope of the embodiments.

The size and shape of the aspects of the embodiments disclosed herein, including but not limited to FIGS. 1C to 1I, may vary to fit different bottles or containers having different openings and fit mechanisms. The material of the embodiments may be metal if and where such material provides any advantage relative to a particular content, or else the material may be mostly a lightweight material. An example of a lightweight material could be fibre-based material, plastic and so forth. The disclosed contour of the nozzle end surface and the tapered angles are intended to serve a purpose such that there are least or no remnants, and least blockage due to residue, though such contour and angles may be modified within the scope of the disclosure. The neck sizing may be variable, and the neck can be optional in some embodiments.

The embodiments can be fit on a normal PET (or similar) bottle, via the opening in the bottom 193B of the third portion 193, with various types of fit such as threaded fit or a slip fit, with or without clamps. The nozzle can be made of plastic or other such kinds of material which are light weight.

Figure 1G:
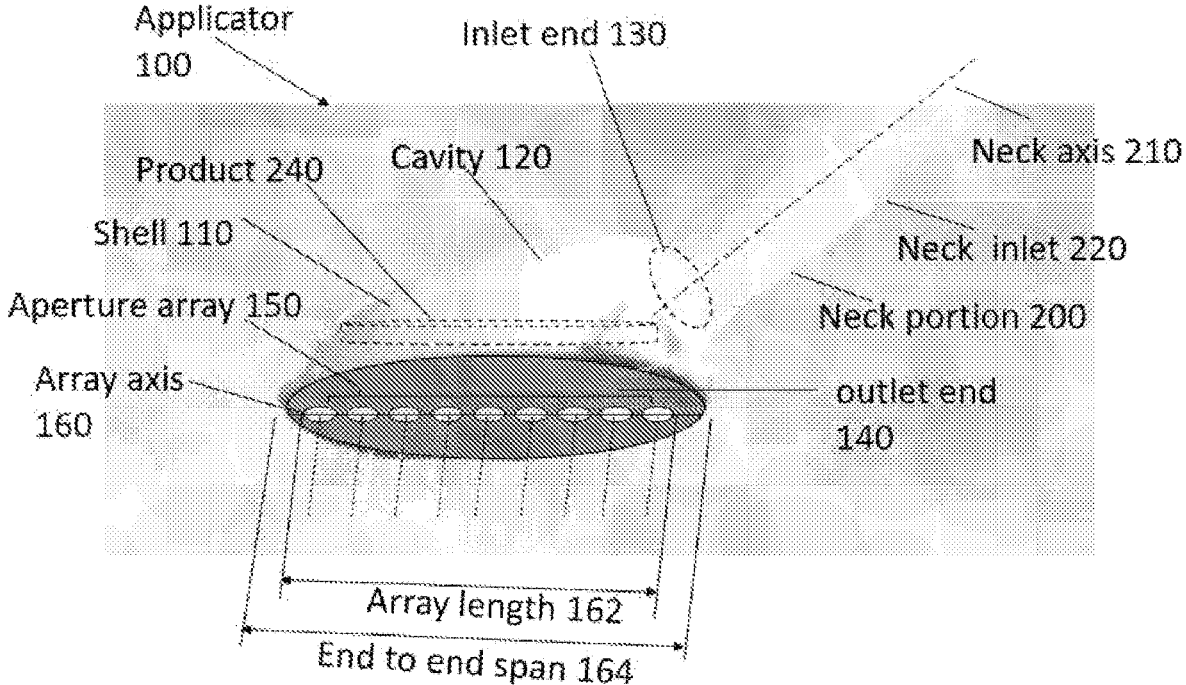
FIG. 1G shows a bottom view of the embodiment of FIG. 1C.

As shown in FIG. 1G, the shell 110 may define a bulbus, arcuate shape. For the configuration of FIG. 1C, as further shown in FIGS. 2B and 2C, the applicator cavity outlet end 140 may define a circular plate. The plate may be flat or have an end to end curvature such as a convex curvature, e.g., bowing outwardly.

As shown in FIGS. 1A-B and 2A the applicator shell 110 may define an applicator neck portion 200, which may be cylindrical, extending away from the applicator cavity inlet end 130 along an applicator neck axis 210 to an applicator neck inlet end 220 having a neck inlet opening. In the embodiment shown in FIG. 1A, the applicator neck axis 210 may extend along the shell-length axis 182. The applicator neck portion 200 may be cylindrical having a diameter that is larger than a total aperture area defined by the linear aperture array 150.

Turning to FIG. 3, a container 250 is shown. The container is illustrated as a watering can, though this is not intended on limiting the scope of the embodiments. The container 250 may include a container shell 255. The container shell 255 may define a container cavity 260 that is capable of storing any fluid. The container shell 255 may include a container cavity inlet end 280, having a cavity inlet opening, that is configured for receiving the product 240. The container 250 may include a container cavity outlet end 290, having a container cavity outlet opening, and a container neck 300, which may be cylindrical or frustoconical, that extends away from the container cavity outlet end 290 along a container neck axis 310 to a container neck outlet end 320, having a container neck outlet opening.

The container neck 300 may be operationally coupled with the applicator neck portion 200 so that the product 240 in the container cavity 260 is configured to flow into the applicator 100 and out of the linear aperture array 150. For example, the applicator neck portion 200 may frictionally couple, screw onto, or be otherwise fastened to the container neck 300. For example, the container neck 300 has a shape that is complementary with the shape of the applicator neck portion 200 such that the applicator neck portion 200 fits over or within the container neck via a slip fit. In one embodiment, the container neck 300 and the applicator neck portion 200 are formed of a continuous material. In one embodiment, the agent 240 is stored in the container 250, such as in the container neck 300 or container cavity 260. In operation, the applicator 100 is positioned at a height 330 of e.g., 50 cm above the plant 340 and produces a product shower 342 (of the product 240) having a shower width 344. The shower would be essentially flat due to the aperture configuration in FIGS. 2A-2C.

In one embodiment, shown in FIGS. 4-5, a flexible pouch 350 has the agent 240 therein. A corner 360 of the pouch 350 may be configured with the linear aperture array 150 so that the pouch 350 defines the container 250 and applicator 100 discussed above. The pouch 350 may have a handle. In operation, the pouch 350 may be pre-filled with water and a shower 370 of plant treatment agent mixed with a solvent or water may be applied out of the pouch 350. Once the pouch 350 is empty, it may be compressed and discarded or recycled.

In one embodiment, shown in FIGS. 6-7, a flexible compressible carton 400, similar to a milk container, has the agent 240 therein. A front or back face 410 of the carton 400 may be configured with the linear aperture array 150 so that the carton 400 defines the container 250 and applicator 100 discussed above. In operation, the carton 400 may be prefilled with water and a shower 420 of plant treatment agent mixed with water may be applied out of the carton 400. Once the carton 400 is empty, it may be compressed and discarded or recycled.

Figure 8:
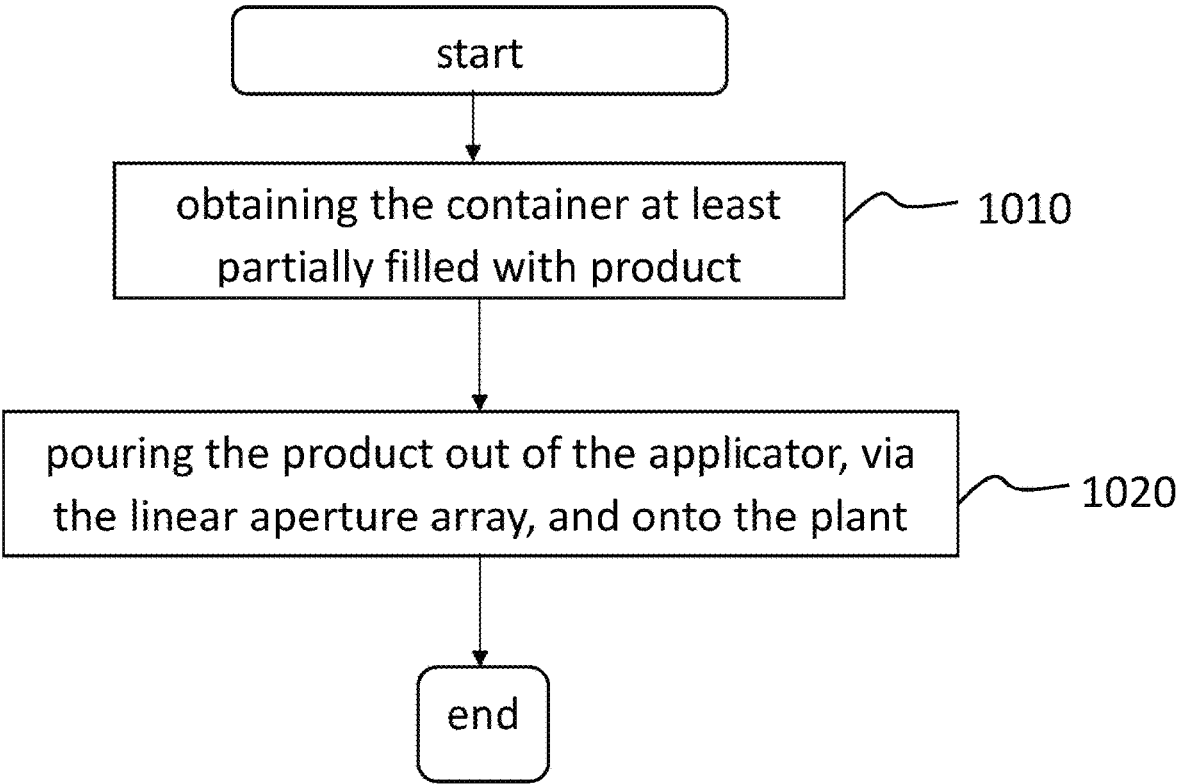
FIG. 8 is a flowchart showing a method of watering a plant with the watering can.

Turning to FIG. 8, a flowchart shows a method of applying a plant treatment agent to a plant. As shown in block 1010, the method includes obtaining the above described container 250 at least partially filled with product 240. As indicated, the container may be prefilled, or filling may be required. As shown in block 1020, the method includes applying a solution of the product 240 out of the applicator 100, via the linear aperture array 150, and onto the plant 340. The applicator may be 50 cm above the plant when the solution is applied out of the applicator and onto the plant.

Table 1, below, identifies differing applicator types (row 1), differing numbers of holes/apertures in the array 150 (row 2), diameter for the holes/apertures in the array 150 (row 3), intra-hole spacing for the holes/apertures in the array 150 (row 4), applicator outlet span 164 (row 5). The observed flow rates for the different configuration are provided (row 6). In addition, a shower width 344 is identified (row 7) for a height 330 at fifty (50) cm above a plant 340.

TABLE 1

| Type of applicator | Round head, linear aperture array (aperture shown in FIGS. 1C, 2B) | Round head, linear aperture array with discrete center aperture cluster (aperture shown in FIGS. 1C, 2C) | Diverging flat end (aperture shown in FIGS. 1C, 2C) | Diverging flat end (aperture shown in FIGS. 1C, 2C) |
|---|---|---|---|---|
| No of holes (apertures) | 9 | 13 | 13 | 17 |
| Diameter(mm) of holes (apertures) | 1 mm | 1 mm | 0.3 mm | 0.3 mm |
| Holes (apertures) spacing (between hole centers) | 5 mm | 5 mm | 2 mm | 2 mm |
| Diameter/length (mm) of plug (applicator outlet span, end to end) | 60 mm length | 60 mm length | 45 mm length | 45 mm length |
| Discharge rate of product mixture (ml/s) | 4.67 | 7.67 | 2.77 | 3.00 |

TABLE 1-continued

| Type of applicator | Round head, linear aperture array (aperture shown in FIGS. 1C, 2B) | Round head, linear aperture array with discrete center aperture cluster (aperture shown in FIGS. 1C, 2C) | Diverging flat end (aperture shown in FIGS. 1C, 2C) | Diverging flat end (aperture shown in FIGS. 1C, 2C) |
|---|---|---|---|---|
| width of shower (cm) of product mixture at 50cm shower height | 20 cm | 20 cm | 20 cm | 31 cm |

From the above apparatus configuration listed in the third column from the left (diverging flat end), observations during testing resulted in a narrow showering spacing and small droplets, with a relatively lowest discharge amount of 2.77 ml/s and a 20 cm shower width. From the configuration listed in the fourth column from the left (also diverging flat end) observations during testing resulted in a narrow shower spacing and a small droplet size, with a uniform showering spacing and relatively improved adhesion to weeds, with wide shower width (31 cm) and discharge rate of 3.00 ml/s.

In an aspect, a ready to use plant treatment agent product comprises a container comprising a plant treatment agent composition, wherein the plant treatment agent composition is applied from the container via applicator of the present disclosure at an undiluted volume of 5-35 ml/m². The plant treatment agent composition can comprise 0.1 to 99 wt % of plant treatment agent(s).

In an embodiment, the plant treatment agent composition can comprise 0.1 to 10 wt % of plant treatment agent, preferably 0.1 to 1 wt % of plant treatment agent, more preferably 0.25 to 0.75 wt % of plant treatment agent.

In another embodiment, the plant treatment agent composition may additionally comprise agrochemically suitable excipients selected from adjuvants, co-solvents, surfactants, colorants, emulsifiers, thickeners, antifreeze agents, biocides, anti-foam agents, stabilizers, wetting agents or a mixture thereof.

In an embodiment, a ready to use product comprises a container comprising the applicator of the present disclosure and a composition comprising a plant treatment agent, wherein the said composition is applied from the said container with the help of the said applicator.

In a preferred embodiment, a ready to use glufosinate product comprises a container comprising the applicator of the present disclosure and a glufosinate composition, wherein the glufosinate composition is applied from the container with the help of the said applicator at an undiluted volume of 15-25 ml/m². The glufosinate composition can comprise 0.1 to 20 wt % of glufosinate, preferably 0.1 to 1 wt % of glufosinate more preferably 0.25 to 0.75 wt % of glufosinate. The glufosinate composition can comprise 0.1 to 10 wt % of glufosinate, preferably 0.1 to 1 wt % of glufosinate more preferably 0.25 to 0.75 wt % of glufosinate. In an embodiment, the container comprises the applicator of the present disclosure. In an embodiment, the applicator is fitted onto the container at the time of application. In an embodiment, the applicator is pre-fitted or fixed to the container comprising glufosinate composition.

Advantages

The above disclosed embodiments provide applicators for distributing a plant treatment agent and to plant, containers, and products for the same, and a method for applying the plant treatment agent to a plant. The embodiments provide for a low spray volume technique that is a labor-saving technique for application of plant treatment agents, particularly for herbicide application of Ready to Use (RTU) formulations as described herein.

The invention is further illustrated by the following non-limiting examples.

EXAMPLES

Example 1: Development of the Flat Shower Plug

Table 2 illustrates a comparison between the flat shower plug with radial shower plug.

TABLE 2

Experimental shower plug attached to spout of watering can

| Spray pattern/applicator | No. of Shower plugs (holes/ apertures) | Shower volume (ml/s) | Shower width (cm) at 50 cm height |
|---|---|---|---|
| Flat shower, developed watering can | 9 | 4.67 | 8 |
| Radial shower, glyphosate RTU (1.2 L) | 12 | 4.67 | 36 |
| Radial shower, glufosinate RTU (2.5 L) | 10 | 13.33 | 25 |

Example 2: Comparison of Spray Volume of Undiluted Commercial Products to the Glufosinate Composition of the Present Invention to Control the Annual and Perennial Weeds Table 3 shows the spray volume of undiluted commercial products compared to the inventive glufosinate composition (RTU formulation). The commercially available glufosinate products are sprayed at a volume of 100 ml/m2 to treat annual and perennial weeds whereas the commercially available glyphosate products are sprayed at 15-30 ml/m2 to treat annual and perennial weeds.

TABLE 3

Comparison of spray volume for glufosinate RTU compared to commercial products

| Product | Applicable weeds | Spray volume (spray without dilution) |
|---|---|---|
| 0.1% Commercially available glufosinate products | Annual and perennial weeds | 100 ml/m² |

TABLE 3-continued

Comparison of spray volume for glufosinate
RTU compared to commercial products

| Product | Applicable weeds | Spray volume (spray without dilution) |
|---|---|---|
| 0.37 wt % Glufosinate composition (RTU) | Annual and perennial weeds | 15-25 ml/m$^2$ |
| 0.56 wt % Glufosinate composition (RTU) | Annual and perennial weeds | 10-15 ml/m$^2$ |

It is evident from the Table 3 that the application rate of glufosinate composition of the present invention is less as compared to that of the commercially available product.

Table 4 shows the efficacy of two different concentrations of glufosinate applied with an applicator according to the present disclosure. The rate of application was 3 L/ha of glufosinate ammonium 18.5%.

TABLE 4

Showing the efficacy of two different concentrations of glufosinate
applied with an applicator according to the present disclosure.

| | Control %: Max weed efficacy | |
|---|---|---|
| Weed | 0.56% applied at 10 ml/m$^2$ | 0.36% applied at 15 ml/m$^2$ |
| Field horsetail | 73 | 76 |
| Water foxtail | 92 | 96 |
| Barnyard grass | 55 | 59 |
| Crabgrass | 81 | 82 |
| White clover | 97 | 93 |
| Broadleaf dock | 99 | 92 |

Example 3: Efficacy of glufosinate ammonium applied using the applicator of the present disclosure and a radial applicator is demonstrated on tall and short rescue grass. 18.5% glufosinate ammonium was diluted 50 times to 0.37% and applied using flat shower (linear applicator of the present disclosure) and the radial shower. Efficacy was checked at 33 days after application (DAA). The observations are recorded in Table 5.

TABLE 5

Comparison of weed control efficacy of glufosinate 18.5% against rescue grass with
different applicator - linear (flat shower) and radial (radial shower) applicator

| Spray pattern/ Applicator | Formulation | Discharge amount ml/s | Spray Volume ml/m$^2$ | Dose equivalent of Glufosinate 18.5% L/ha | % Control of grass at 33 days after application (DAA) | |
|---|---|---|---|---|---|---|
| | | | | | 30 cm weeds (tall grass) | 20 cm weeds (short grass) |
| Flat shower/ linear applicator with 9 holes | Glufosinate 0.37% | 4.67 | 25 | 5 | 96 | 97 |
| Radial shower/ radial applicator with 12 holes | Glufosinate 0.37% | 4.67 | 25 | 5 | 83 | 81 |

The use of the terms "a" and "an" and "the" and similar referents (especially in the context of the following claims) are to be construed to cover both the singular and the plural, unless otherwise indicated herein or clearly contradicted by context. The terms first, second etc. as used herein are not meant to denote any particular ordering, but simply for convenience to denote a plurality of, for example, layers. The terms "comprising", "having", "including", and "containing" are to be construed as open-ended terms (i.e., meaning "including, but not limited to") unless otherwise noted. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10% or 5% of the stated value. Recitation of ranges of values are merely intended to serve as a shorthand method of referring individually to each separate value falling within the range, unless otherwise indicated herein, and each separate value is incorporated into the specification as if it were individually recited herein. The endpoints of all ranges are included within the range and independently combinable. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiment disclosed as the best mode contemplated for carrying out this invention, but that the invention will include all embodiments falling within the scope of the appended claims. Any combination of the above-described elements in all possible variations thereof is encompassed by the invention unless otherwise indicated herein or otherwise clearly contradicted by context.

What is claimed is:

1. An applicator for applying a plant treatment agent to a plant via a container, the applicator comprising:
   an applicator shell defining an applicator cavity, an applicator cavity inlet end and an applicator cavity outlet end spaced apart from the applicator cavity inlet end by the applicator cavity, and
   wherein the applicator cavity outlet end defines a flat end nozzle and a linear aperture array, and wherein apertures of the linear aperture array are disposed along a straight array axis on the flat end nozzle.

2. The applicator of claim 1, wherein the linear aperture array has an array length that is between 90% and 100% of an end to end span of the applicator cavity outlet end along the array axis.

3. The applicator of claim 2, wherein the linear aperture array has a discrete center array portion, defining a discrete set of apertures surrounding a linear center of the linear aperture array and that are centered on the array axis.

4. The applicator of claim 3, wherein the discrete center array portion extends between 10% and 30% of the array length of the linear aperture array, and is symmetric about the array axis.

5. The applicator of claim 3, wherein the discrete center array portion has a widthwise span that is the same as its lengthwise span.

6. The applicator of claim 3, wherein each aperture in the linear aperture array (150) has a same size and shape as each other.

7. The applicator of claim 4, wherein the applicator shell extends along a shell-length axis from the applicator cavity inlet end to the applicator cavity outlet end; diverges along a shell-width axis that is perpendicular to the shell-length axis from the applicator cavity inlet end to the applicator cavity outlet end; and converges relative to a shell-thickness axis that is perpendicular to the shell-length axis and the shell-width axis from the applicator cavity inlet end (130) to the applicator cavity outlet end, such that an outer boundary of the applicator cavity outlet end defines a narrow-elongate portion of the applicator, and to thereby define a flat end nozzle.

8. The applicator of claim 1, wherein the applicator cavity outlet end defines a circular plate.

9. The applicator of claim 1, wherein the applicator shell defines an applicator neck portion extending away from the applicator cavity inlet end along an applicator neck axis to an applicator neck inlet end.

10. An applicator for applying a plant treatment agent to a plant via a container, the applicator comprising:
   an applicator shell defining an applicator cavity, an applicator cavity inlet end and an applicator cavity outlet end spaced apart from the applicator cavity inlet end by the applicator cavity, and
   wherein the applicator cavity outlet end defines a linear aperture array;
   the apertures of the linear aperture array are disposed along an array axis;
   the applicator shell defines an applicator neck portion extending away from the applicator cavity inlet end along an applicator neck axis to an applicator neck inlet end; and the applicator neck portion is cylindrical having an applicator inlet diameter at the applicator neck inlet end that is larger than a total aperture area defined by the linear aperture array.

11. An applicator for applying a plant treatment agent to a plant via a container, the applicator comprising:
   an applicator shell defining an applicator cavity, an applicator cavity inlet end and an applicator cavity outlet end spaced apart from the applicator cavity inlet end by the applicator cavity,
   wherein the applicator cavity outlet end defines a linear aperture array, the apertures of the linear aperture array are disposed along an array axis; and the applicator comprises a glufosinate product stored in the applicator cavity.

12. A container for distributing a plant treatment agent to a plant, comprising:
   a container shell defining:
      a container cavity that is configured to store a fluid;
      a container cavity inlet end for receiving the fluid;
      a container cavity outlet end, and a container neck extends away from the container cavity outlet end along a container neck axis to a container neck outlet end; and
   the applicator of claim 9, wherein the container neck is operationally coupled with the applicator neck portion so that the fluid in the container cavity is configured to flow into the applicator and out of the linear aperture array.

13. The container of claim 12, wherein the container neck and the applicator neck are formed of a continuous material.

14. The container of claim 12, wherein the container neck has a shape that is complementary with the shape of the applicator neck such that the applicator neck fits against the container neck via a fit selected from the group consisting of clamp fit, thread fit, slip fit and snap fit.

15. The container of claim 12, comprising a plant treatment agent disposed in the applicator cavity or the container cavity.

16. A method of applying a plant treatment agent to a plant, comprising:
   obtaining the container of claim 12, at least partially filled with a fluid; and
   applying a solution of the fluid and the plant treatment agent out of the applicator (100), via the linear aperture array, and onto the plant.

17. A ready to use product comprising a container comprising the applicator of claim 1 and a composition comprising a plant treatment agent, wherein the said composition is applied from the said container with the help of the said applicator.

18. The ready to use product of claim 17, wherein the plant treatment agent composition comprises 0.1 to 99 wt % of plant treatment agent.

19. The ready to use product of claim 17, wherein the plant treatment agent is an herbicide.

20. The ready to use product of claim 17, wherein the composition is a glufosinate composition, wherein the glufosinate composition has a glufosinate concentration of 0.1 to 10 wt % and is applied from the container at an undiluted volume of 15-25 ml/m2.

* * * * *